US011042081B2

(12) United States Patent
Pertierra et al.

(10) Patent No.: US 11,042,081 B2
(45) Date of Patent: Jun. 22, 2021

(54) APERTURE SHARING FOR HIGHLIGHT PROJECTION

(71) Applicant: Dolby Laboratories Licensing Corporation, San Francisco, CA (US)

(72) Inventors: Juan P. Pertierra, Indianapolis, IN (US); Martin J. Richards, Gig Harbor, WA (US); Barret Lippey, Foster City, CA (US); Nathan S. Wainwright, Melissa, TX (US); John D. Jackson, Allen, TX (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/690,602

(22) Filed: Nov. 21, 2019

(65) Prior Publication Data

US 2020/0089096 A1    Mar. 19, 2020

Related U.S. Application Data

(63) Continuation of application No. 16/184,788, filed on Nov. 8, 2018, now Pat. No. 10,488,746.
(Continued)

(51) Int. Cl.
*G03B 21/14* (2006.01)
*G03B 21/26* (2006.01)
(Continued)

(52) U.S. Cl.
CPC .......... *G03B 21/26* (2013.01); *G03B 21/005* (2013.01); *G03B 21/2033* (2013.01);
(Continued)

(58) Field of Classification Search
CPC .... G03B 21/14; G03B 21/005; G03B 21/006; G03B 21/008; H04N 9/31; H04N 9/3102
(Continued)

(56) References Cited

U.S. PATENT DOCUMENTS 6,545,814 B2   4/2003   Bartlett
6,911,977 B2   6/2005   David
(Continued)

FOREIGN PATENT DOCUMENTS

JP   2004023460   1/2004

OTHER PUBLICATIONS

US 9,906,760, 2/2018, MTT Innovation (withdrawn).

*Primary Examiner* — William C. Dowling

(57) ABSTRACT

A novel projection system includes a base signal source, a highlight signal source, a base/highlight destination, and a shared optical element. A base signal provided by the base source and a highlight signal provided by the highlight source are combined by the shared optical element. In a particular embodiment, the base signal source and the highlight signal source each include a light source, a spatial light modulator, and optics, and the base/highlight destination includes optics and a spatial light modulator. In a more particular embodiment, the base signal source and the highlight source provide spatially modulated lightfields to the shared optical element. In another particular embodiment, the base signal and the highlight signal are modulated by the spatial light modulator of the base/highlight destination after being combined.

18 Claims, 12 Drawing Sheets

Related U.S. Application Data

(60) Provisional application No. 62/585,596, filed on Nov. 14, 2017.

(51) Int. Cl.
   *H04N 9/31* (2006.01)
   *G03B 21/20* (2006.01)
   *G03B 21/00* (2006.01)

(52) U.S. Cl.
   CPC ......... *H04N 9/3105* (2013.01); *H04N 9/3126* (2013.01); *H04N 9/3164* (2013.01); *H04N 9/3182* (2013.01)

(58) Field of Classification Search
   USPC ..................................................... 353/30, 94
   See application file for complete search history.

(56) References Cited

U.S. PATENT DOCUMENTS

| | | | |
|---|---|---|---|
| 6,988,806 | B2 | 1/2006 | Slobodin |
| 7,959,297 | B2 | 6/2011 | Silverstein |
| 8,958,137 | B2 | 2/2015 | Haussler |
| 9,094,609 | B2 | 7/2015 | Kim |
| 9,531,982 | B2 | 12/2016 | Richards |
| 9,848,176 | B2 | 12/2017 | Damberg |
| 9,874,319 | B2 | 1/2018 | Minor |
| 10,003,776 | B2 | 6/2018 | Damberg |
| 10,534,316 | B2 * | 1/2020 | Gorny ............. G03B 21/28 |
| 2006/0072075 | A1 | 4/2006 | De Vaan |
| 2008/0180642 | A1 | 7/2008 | Wichner |
| 2014/0043352 | A1 | 2/2014 | Damberg |
| 2016/0381329 | A1 * | 12/2016 | Damberg ............ G03H 1/2294 348/40 |
| 2017/0150107 | A1 | 5/2017 | Kozak |
| 2018/0048873 | A1 | 2/2018 | Damberg |
| 2018/0176519 | A1 | 6/2018 | Damberg |

* cited by examiner

APERTURE SHARING FOR HIGHLIGHT PROJECTION

CROSS-REFERENCE TO RELATED APPLICATION

This application is a continuation and claims the benefit of priority to U.S. patent application Ser. No. 16/184,788 filed Nov. 8, 2018 which claims priority to U.S. Application No. 62/585,596 filed Nov. 14, 2017, all which are hereby incorporated by reference in their entirety.

BACKGROUND OF THE INVENTION

Field of the Invention

This invention relates generally to image projection systems and more particularly to projection systems that combine multiple imaging signals.

Description of the Background Art

Projection systems that combine multiple imaging signals are known. For example, prior art systems are capable of combining a high dynamic range signal with a high brightness signal, to produce a signal having both a high dynamic range and a high brightness. However, the prior art systems are not entirely satisfactory, because they combine the signals on the viewable medium (e.g., a projector screen) and, thus, do not allow for additional signal manipulation after the two signals have been combined.

Other prior art solutions provide a means for injecting light into a projection system. However, such systems only introduce homogenous light from solid state sources. Therefore, these solutions do not allow for signal manipulation before the signals are combined.

Additionally, prior art systems that combine multiple imaging signals have not been able to satisfactorily generate images having high quality and high dynamic range while maintaining satisfactory projection efficiency.

SUMMARY

The present invention overcomes the problems associated with the prior art by providing systems and methods of combining modulated beams within a projection system. The invention facilitates the combination of base image beams and highlight beams, resulting in improved image quality and dynamic range at greater efficiency than known systems.

Example methods for generating images are disclosed. One example method includes providing a first lightfield to a first modulator and modulating the first lightfield to form a first modulated lightfield. The example method additionally includes providing a second lightfield to a second modulator and modulating the second lightfield to form a second modulated lightfield. The first modulated lightfield and the second modulated lightfield are combined to form a combined lightfield, and the combined lightfield is directed toward a third modulator. The example method additionally includes modulating the combined lightfield to form an imaging lightfield.

In a particular example method, the step of combining the first modulated lightfield and the second modulated lightfield includes directing the first modulated lightfield and the second modulated lightfield along a common optical path of an on-axis beam combiner.

In an alternate particular method, the step of combining the first modulated lightfield and the second modulated lightfield includes directing the first modulated lightfield into a first portion of a relay aperture and directing the second modulated lightfield into a second portion of the relay aperture. The step of directing the first modulated lightfield into the first portion of the relay aperture can include directing the first modulated lightfield toward a reflective surface oriented to direct the first modulated lightfield into the first portion of the relay aperture. The step of directing the first modulated lightfield toward a reflective surface can include positioning the reflective surface in an optical path of the first modulated lightfield and out of an optical path of the second modulated lightfield. The step of positioning the reflective surface in an optical path of the first modulated lightfield and out of the optical path of the second modulated lightfield can include positioning the reflective surface adjacent the second portion of the relay aperture.

In another example method, the step of directing the first modulated lightfield toward a reflective surface can include positioning the reflective surface in an optical path of the first modulated lightfield and in the optical path of the second modulated lightfield. In a particular example method, the step of positioning the reflective surface inside of an optical path of the first modulated lightfield and inside the optical path of the second modulated lightfield includes positioning a mirror including the reflective surface in the optical path of the second modulated lightfield. The mirror (back surface) blocks a first portion of the second modulated lightfield to cause the second portion of the relay aperture to have an annular shape. The reflective surface of the mirror defines the first portion of the relay aperture.

Another particular example method additionally includes receiving image data, and the step of modulating the first lightfield to form a first modulated lightfield includes modulating the first lightfield based at least in part on the image data. In addition, the step of modulating the second lightfield to form a second modulated lightfield includes modulating the second lightfield based at least in part on the image data, and the step of modulating the combined lightfield to form an imaging lightfield includes modulating the combined lightfield based at least in part on the image data.

In another particular example method, the step of modulating the first lightfield to form a first modulated lightfield can include steering portions of the first lightfield. In addition, the step of modulating the second lightfield to form a second modulated lightfield can include steering portions of the second lightfield. The step of modulating the combined lightfield to form an imaging lightfield includes spatially modulating the combined lightfield with, for example, a digital mirror device.

Systems for generating images (e.g., projection systems) are also disclosed. One example system includes a first modulator configured to modulate a first lightfield, to form a first modulated lightfield, and a second modulator configured to modulate a second lightfield, to form a second modulated lightfield. The example system additionally includes an optical element configured to combine the first modulated lightfield and the second modulated lightfield to form a combined lightfield. A third modulator is configured to modulate the combined lightfield to form an imaging lightfield. In a particular example system, the optical element directs the first modulated lightfield and the second modulated lightfield along a common optical path. In an even more particular system, the optical element is a beam combiner.

In another example system, the optical element includes a reflective surface oriented to direct the first modulated lightfield along an optical path of the second modulated lightfield. In a particular embodiment, the reflective surface is positioned in an optical path of the first modulated lightfield and outside the optical path of the second modulated lightfield. In a more particular example embodiment, the reflective surface is positioned adjacent an aperture, and the optical path of the second modulated lightfield is directed through the aperture.

In yet another example system, the reflective surface is positioned inside of an optical path of the first modulated lightfield and inside the optical path of the second modulated lightfield. For example, the reflective surface can be positioned within an aperture, and the optical path of the second modulated lightfield can be directed through the aperture.

A disclosed example system additionally includes a controller connected to receive image data and to provide a first set of control instructions to the first modulator, a second set of control instructions to the second modulator, and a third set of control instructions to the third modulator. The first modulator modulates the first lightfield responsive to the first set of control instructions, the second modulator modulates the second lightfield responsive to the second set of control instructions, and the third modulator modulates the combined lightfield responsive to the third set of control instructions. The first set of control instructions, the second set of control instructions, and the third set of control instructions are based at least in part on the image data.

Optionally, in the example systems, at least one of the first modulator and the second modulator is a beam-steering (e.g., a phase modulating) spatial light modulator, and the third modulator can be the same or different (e.g., a digital mirror device) type of spatial light modulator.

Another example method for generating images includes defining a relay aperture for a projection system, allocating a first portion of the relay aperture for a spatially modulated base image beam, and allocating a second portion of the relay aperture for a spatially modulated highlight beam. The method additionally includes combining the spatially modulated base image beam and the spatially modulated highlight image beam by directing the spatially modulated base image beam into the first portion of the relay aperture and directing the spatially modulated highlight beam into the second portion of the relay aperture. A particular example method additionally includes defining a projection aperture for the projection system. The relay aperture has an F-number greater than or equal to the F-number of the projection aperture.

In one example method, the first portion of the relay aperture and the second portion of the relay aperture are exclusive of each other. For example, the first portion of the relay aperture can be immediately adjacent the second portion of the relay aperture. In another example method, the first portion of the relay aperture is annular in shape, and the second portion of the relay aperture is disposed within an inner perimeter of the first portion of the relay aperture.

In an example method, the step of combining the spatially modulated base image beam and the spatially modulated highlight image beam includes directing the spatially modulated base image beam and the spatially modulated highlight beam along non-parallel axes. In a particular example method, the step of directing the spatially modulated highlight beam into the second portion of the relay aperture includes positioning a mirror to reflect the spatially modulated highlight beam into the second portion of the relay aperture. Alternatively, the step of combining the spatially modulated base image beam and the spatially modulated highlight image beam can include directing the spatially modulated base image beam and the spatially modulated highlight beam along coincident axes.

In some example methods, the second portion of the relay aperture is de-centered with respect to a system axis of the projection system. Optionally, a total area of the second portion of the relay aperture is smaller than a total area of the first portion of the relay aperture.

In the example methods, at least one of the spatially modulated base image beam and the spatially modulated highlight beam is generated with a beam-steering (e.g., phase modulating) spatial light modulator.

Another example system for generating images includes a relay aperture, a light source, a first modulator, first optics, a second modulator, and second optics. The relay aperture has a first portion and a second portion. The light source is configured to generate a first beam and a second beam. The first modulator is configured to spatially modulate the first beam to generate a spatially modulated base image beam. The first optics are configured to direct the spatially modulated base image beam into the first portion of the relay aperture. The second modulator is configured to spatially modulate the second beam to generate a spatially modulated highlight beam, and the second optics are configured to direct the spatially modulated highlight beam into the second portion of the relay aperture. A particular example system, additionally includes a projection aperture, and the relay aperture has an F-number greater than or equal to the F-number of the projection aperture.

In an example system, the first portion of the relay aperture and the second portion of the relay aperture are exclusive of each other. For example, the first portion of the relay aperture can be adjacent the second portion of the relay aperture. In a different example system, the first portion of the relay aperture is annular in shape, and the second portion of the relay aperture is disposed within an inner perimeter of the first portion of the relay aperture.

In an example system, the second optics include a reflective surface configured to direct the spatially modulated highlight beam along a highlight axis, the first optics are configured to direct the spatially modulated base image beam along a base image axis, and the highlight axis and the base image axis are non-parallel axes. Alternatively, the second optics include a reflective surface configured to direct the spatially modulated highlight beam along a highlight axis, the first optics are configured to direct the spatially modulated base image beam along a base image axis, and the highlight axis and the base image axis are coincident axes.

A more particular example system additionally includes a mirror positioned to direct the spatially modulated highlight beam into the second portion of the relay aperture. The second portion of the relay aperture is de-centered with respect to a system axis of the system, and a total area of the second portion of the relay aperture is smaller than a total area of the first portion of the relay aperture.

In disclosed example systems, at least one of the first modulator and the second modulator is a beam-steering spatial light modulator.

Another example system for generating images includes a first spatial light modulator, a second spatial light modulator, a third spatial light modulator, and optics. The first spatial light modulator is configured to generate a first modulated beam infused with a first image. The second spatial light modulator configured to generate a second modulated beam infused with a second image different from the first image.

The optics are configured to simultaneously focus the first image and the second image on an image plane of the third spatial light modulator. At least one of the first spatial light modulator and the second spatial light modulator is a beam-steering spatial light modulator.

Another example method for generating images includes producing a first modulated beam infused with a first image, producing a second modulated beam infused with a second image, and simultaneously focusing the first image and the second image on an image plane of a same spatial light modulator. The example method additionally includes further modulating the first modulated beam and the second modulated beam with the spatial light modulator to generate an image beam.

Another example system for generating images includes a first spatial light modulator, a second spatial light modulator, and a third spatial light modulator. The first spatial light modulator is configured to generate a first modulated beam infused with a first image. The second spatial light modulator is configured to generate a second modulated beam infused with a second image different from the first image. The example system additionally includes means for simultaneously focusing the first image and the second image on an image plane of the third spatial light modulator.

A non-transitory electronically readable medium is also disclosed. The electronically readable medium has code embodied therein that, when executed, will cause a projection system to produce a first modulated beam infused with a first image, produce a second modulated beam infused with a second image, and simultaneously focus the first image and the second image on an image plane of a same spatial light modulator. The code will additionally cause the projection system to further modulate the first modulated beam and the second modulated beam with the spatial light modulator to generate an image beam.

An example extended range projector is also disclosed. The example extended range projector includes a main optical path, for transmitting an image, and a highlight optical path, for transmitting highlight illuminations of the image. The example extended range projector additionally includes a means for combining the main optical path and the highlight optical path. In a particular example projector, the highlight optical path is injected into the main optical path by reflection from outside of the main optical path. In a more particular example projector, the highlight path is reflected from outside the main optical path and inside a circle defined by a radius from a major axis of the main optical path to a nearest corner of the main optical path. In another more particular example projector, the highlight path is reflected from outside the main optical path and inside a circle defined by a radius of a downstream optical element in the main optical path. Optionally, the highlight optical path can be injected into the main optical path at a periphery of the main optical path.

In an example projector, the highlight optical path is projected through at least one optical element shared with the main optical path and is at least partially outside the main optical path through the optical element en route to illuminating a modulating surface of a primary modulator. Optionally, all light rays of the highlight optical path illuminate the modulating surface.

In a particular example projector, the means for combining comprises a mirror adjacent to the main optical path. The mirror is configured to direct the highlight optical path into and outside the main optical path in a manner such that portions outside the main optical path ultimately converge with the main optical path. The combined optical paths illuminate a modulating surface of a primary modulator. The illumination of the modulating surface can include a registration of the highlight image and the approximation of the image.

A particular extended range projector additionally includes a controller configured to determine an illumination on each pixel of the primary modulator comprising the approximation and highlights. The controller adjusts the modulation of the primary modulator so as to produce the desired image. In a more particular example extended range projector, the amount of illumination includes an angular component of the highlight portions of the illumination and the modulation adjustment takes into account the angular component.

An example controller for a projector comprising a highlight image and a base image is also disclosed. The controller is configured to determine illuminations amounts corresponding to pixels of a primary modulator. The illuminations comprise a convergence of portions of the base image modulated by a base image pre-modulator and portions of the highlight image modulated by a highlight image pre-modulator different from the base image pre-modulator. The illumination amounts include where the highlight image registered with the base image and where the highlight image converges with the base image within the projector from essentially parallel to, but completely outside, a light path of the base image to fully registered with the base image and combined with the base image at the modulating surface. Optionally, the base modulator comprises a different architecture than the highlight modulator. For example, one of the base modulator and the highlight modulator can comprise one of a wavefront modulator and a holographic modulator, and the other of the base and highlight modulators can comprise an amplitude modulator. In a particular example controller, the highlight modulator comprises a wavefront modulator, and the primary modulator comprises an amplitude modulator.

Another example extended range projector includes a main optical path for transmitting an image, and a highlight optical path for transmitting highlight illuminations of the image. The example projector additionally includes means for combining the main optical path and the highlight optical path. In a particular example projector, the main optical path comprises a rectangular aperture, and the means for combining comprises a combining element outside of the main optical path that does not block any light of the rectangular aperture and is located on the long side of the rectangular aperture.

The combining element can comprise a non-rectangular aperture. In addition, the combining element can reflect a relatively small highlight comprising a spot into the main aperture. The highlight beam can be focused to a small spot where it joins with the main beam. The combining element can reflect a highlight projection into the main aperture, and the highlight projection can include a small but bright area relative to the overall area of the combined aperture. In a particular example projector, the combining element reflects a highlight projection into the main aperture, and the highlight projection comprising less than 50% of the combined optical path at a primary modulator of the extended range projector.

Another example extended range projector includes a main optical path for transmitting an image and a highlight optical path for transmitting highlight illuminations of the image. The example projector additionally includes a means for combining the main optical path and the highlight optical path. In a particular example projector, the main optical path comprises a rectangular aperture, and the highlight optical path comprises an aperture smaller than the rectangular aperture and positioned outside but adjacent to one side of the rectangular aperture. The highlight path and the main optical path utilize the same optical elements downstream from the means for combining, even before the main and highlight paths are fully combined. In addition, the highlight path and the main optical path can utilize the same optical elements downstream from the means for combining, even while some portions of the highlight path remain outside the main optical path.

In any of the disclosed systems and methods, the highlight path and the main optical path can remain not fully combined until impacting a primary modulator of the extended range projector. When fully combined, the highlight path can be of a different size and or shape than the fully combined paths.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a system for combining separately modulated light signals prior to additional modulation. In the following description, numerous specific details are set forth (e.g., types of modulators, light sources, etc.) in order to provide a thorough understanding of the invention. Those skilled in the art will recognize, however, that the invention may be practiced apart from these specific details. In other instances, details of well-known projection practices (e.g., image data manipulation, optics setup, routine optimization, etc.) and components have been omitted, so as not to unnecessarily obscure the present invention.

Figure 1:
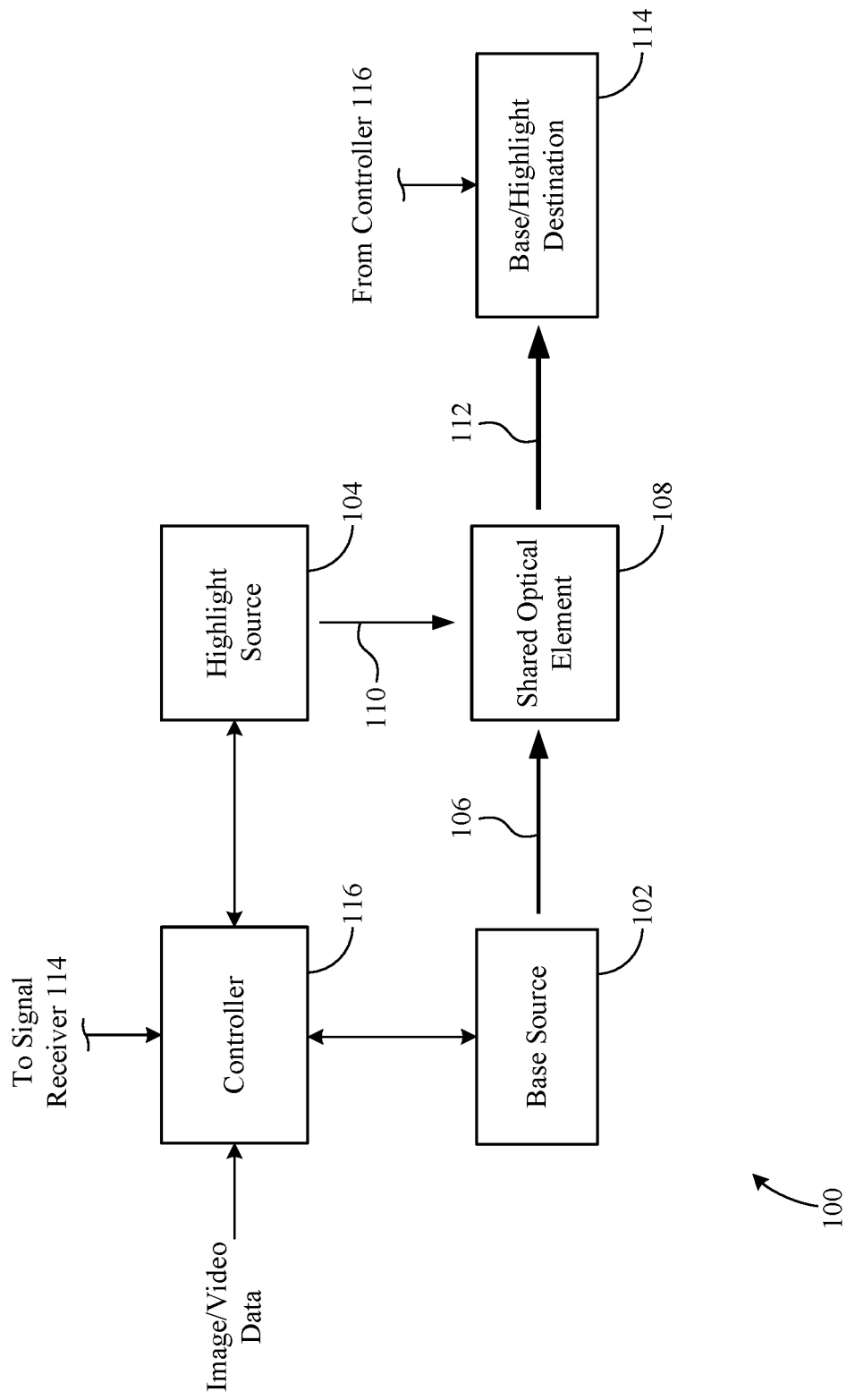
FIG. 1 is a block diagram showing a projection system adapted to add highlights to a projected base image.

FIG. 1 is a block diagram showing a projection system 100 adapted to add highlight illumination to a projected base image. The highlight illumination increases the maximum intensity levels and dynamic range of projection system 100. System 100 includes a base source 102 and a highlight source 104. Base source 102 is adapted to provide a spatially modulated base signal 106 to a shared optical element 108, and highlight source 104 is adapted to provide a spatially modulated highlight signal 110 to optical element 108. Shared optical element 108 combines base signal 106 and highlight signal 110 to form a combined signal 112, which is directed toward a base/highlight destination 114. A controller 116 is connected to receive image/video data from a data source (not shown) and provide control signals to base source 102, highlight source 104, and base/highlight destination 114, based at least in part on the received image/video data. Controller 116 provides coordination between the various components of projection system 100.

Figure 2:
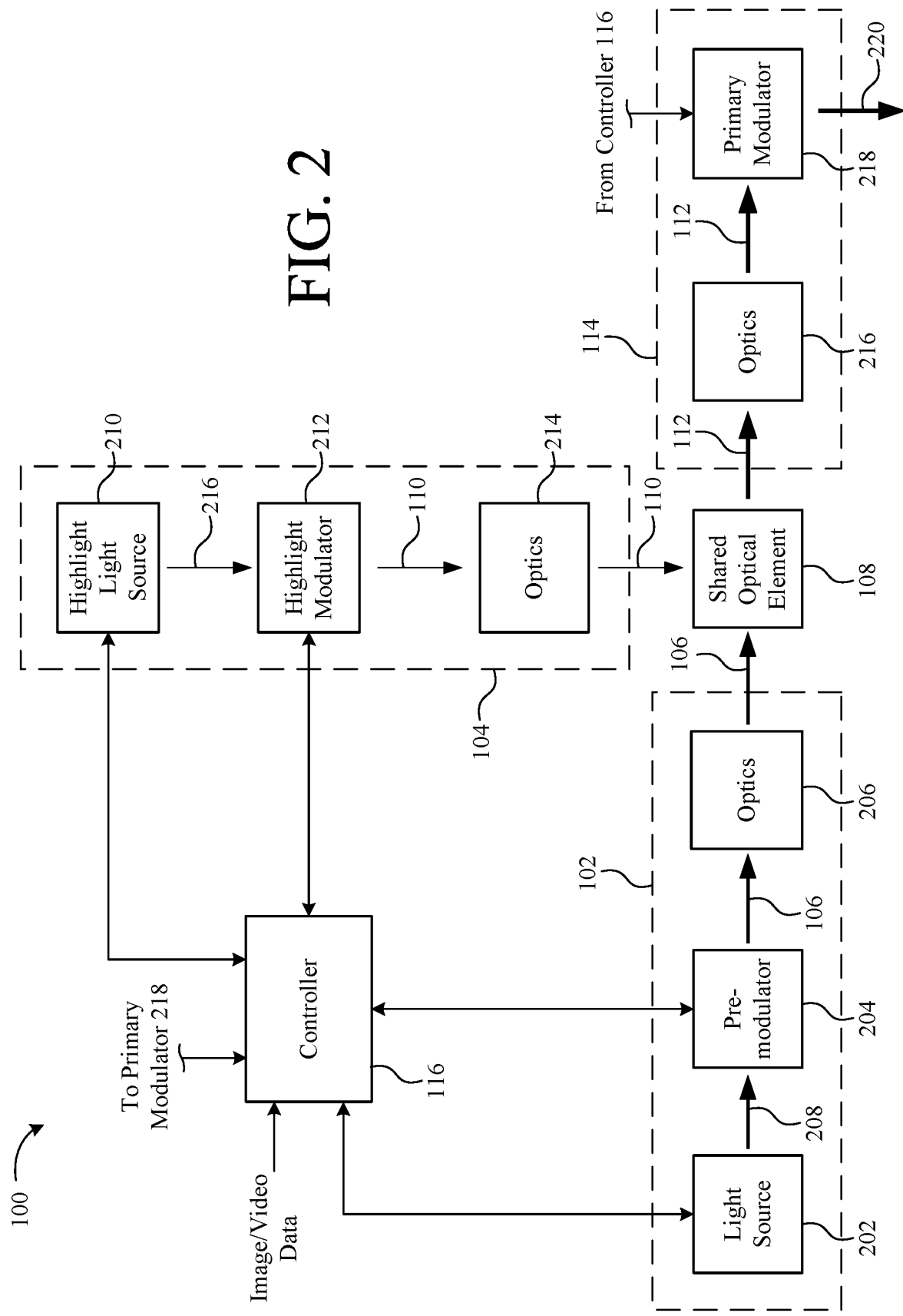
FIG. 2 is a block diagram showing the projection system of FIG. 1 in more detail.

FIG. 2 is a block diagram showing projection system 100 in more detail. Base source 102 includes a light source 202, a pre-modulator 204, and optics 206. In this particular example embodiment, light source 202 is a laser array, adapted to provide a homogenous lightfield 208 to pre-modulator 204. However, light source 202 can optionally be a light emitting diode (LED), LED array, an arc lamp, another modulator, or any other suitable light source. Light source 202 also receives control signals from controller 116, which cause light source 202 to energize a subset of lasers to provide white light, colored light, and/or time-multiplexed RGB light to pre-modulator 204. Pre-modulator 204, responsive to control signals (e.g., image data) from controller 116, spatially modulates lightfield 208 to produce base signal 106 (e.g., a beam infused with an image), which is directed toward optics 206. Optics 206 focus and/or defocus base signal 106 and direct it toward shared optical element 108.

Highlight source 104 includes a highlight light source 210, a highlight modulator 212, and optics 214. In this example embodiment, highlight light source 210 is a low-etendue laser array adapted to provide a homogenous lightfield 216 to highlight modulator 212. Highlight light source 210 is substantially similar to light source 202, but can be controlled independently of light source 202. For example, highlight light source 210 can be controlled such that lightfield 216 is significantly dimmer than or a different color than lightfield 208. Highlight modulator 212, responsive to control signals from controller 116, spatially modulates lightfield 216 to produce highlight signal 110 (e.g., a beam infused with a different image than base signal 106), which is directed toward optics 214. Optics 214 focus and/or defocus highlight signal 110 and direct it toward shared optical element 108.

Shared optical element 108 is an optical element configured to combine base signal 106 and highlight signal 110. In the example embodiment, shared optical element 108 is a solid object defining an aperture and having a reflective surface thereon. The reflective surface is positioned adjacent to the aperture. At least a portion of base signal 106 is directed through the aperture by optics 206 and at least a portion of highlight signal 110 is reflected from the reflective surface. Shared optical element 108 is configured such that the portion of base signal 106 directed through the aperture and the portion of highlight signal 110 reflected from the reflective surface are directed along the same or closely positioned optical path (i.e. combined to form combined signal 112) toward signal destination 114. Shared optical element 108 will be described in further detail with reference to FIGS. 3, 4, and 5 below.

Base/highlight destination 114 includes optics 216 and a primary modulator 218. Optics 216 focus and/or defocus combined signal 112 and direct it toward an image plane of primary modulator 218. Primary modulator 218 spatially modulates combined signal 112 to generate an imaging signal 220, which is directed toward additional projection optics or a viewing medium (not shown). Primary modulator 218, as well as pre-modulator 204 and highlight modulator 212 are spatial light modulators (SLMs). In the example embodiment, pre-modulator 204 and highlight modulator 212 are beam-steering SLMs. Examples of such beam-steering SLMs include, but are not limited to, microelectromechanical systems (MEMS) mirror devices, liquid crystal phase modulators, tip-tilt mirror devices, and so on. Additionally, primary modulator 218 is an amplitude modulating SLM. Examples of such amplitude modulating SLMs include, but are not limited to, digital micro-mirror device (DMD), liquid crystal amplitude modulator, and so on. In alternate embodiments any of pre-modulator 204, highlight modulator 212, and primary modulator 218 can be either beam-steering modulators or amplitude modulators, as needed, for a given application. For example, in one particular system, premodulator 204 and primary modulator 218 are both amplitude modulating SLMs, and highlight modulator 212 is a beam-steering SLM.

Projection system 100 is capable of generating images having high dynamic range and image quality while maintaining projection efficiency. Because pre-modulator 204 and highlight modulator 212 are beam-steering modulators, light can be optimally distributed in base signal 106 and highlight signal 110. Additionally, highlight source 104 may not be required to produce many of the desired projection images, and controller 116 can provide control signals to cause highlight light source 210 to shut off when not required. Similarly, controller 116 can provide control signals to cause highlight light source 210 (and/or light source 202) to become dimmer or brighter as needed for particular images.

Figure 3:
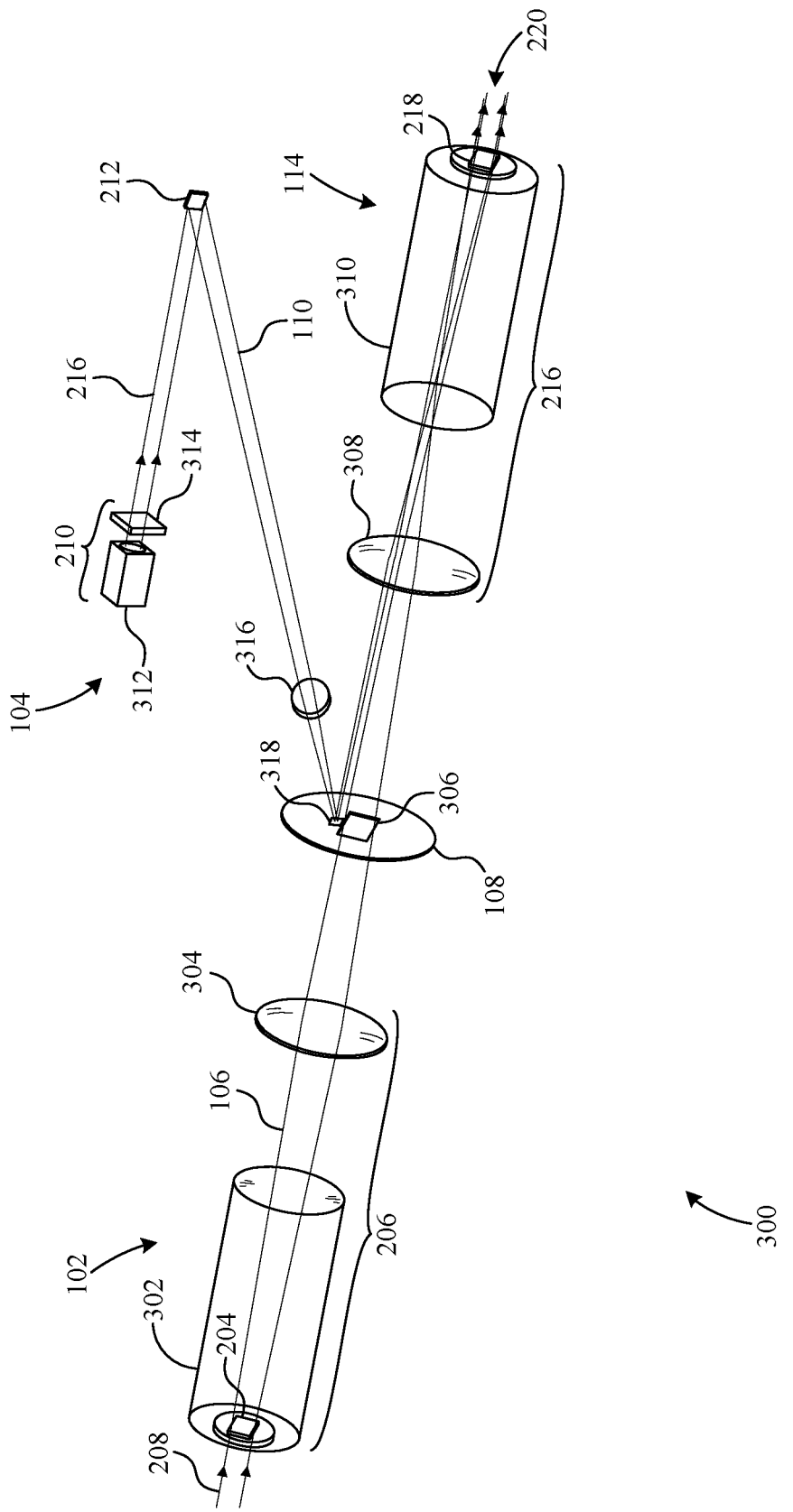
FIG. 3 is a perspective view showing an example physical embodiment of a portion of the projection system of FIG. 1.

FIG. 3 is a perspective view showing a physical embodiment of a portion 300 of projection system 100. Portion 300 includes a portion of base source 102, the entirety of highlight source 104 and signal destination 114, and shared optical element 108. Pre-modulator 204 of base source 102 is positioned adjacent a prism 302. Pre-modulator 204 receives lightfield 208 from light source 202 (FIG. 2) and spatially modulates lightfield 208 to form base signal 106, which is directed into prism 302. Upon exiting prism 302, base signal 106 is transmitted through a lens group 304. Together, prism 302 and lens group 304 compose optics 206. Lens group 304 transmits base signal 106 toward shared optical element 108, which includes an aperture 306, the aperture stop of the optical system. Base signal 106 passes through aperture 306 and onto a second lens group 308. Lens group 308 transmits base signal 106 into a prism 310, which directs base signal 106 onto primary modulator 218. Together, lens group 308 and prism 310 compose optics 216.

Although shown as transmissive SLMs for clear illustration, pre-modulator 204 and primary modulator 218 can be, and most likely would be, reflective SLMs. In addition, although prisms 302 and 310 are shown representationally as cylindrical prisms, the particular shapes of prisms 302 and 310 can be varied (e.g., could be total internal reflection (TIR) prisms or in multi-color systems could be Philips prisms) depending on the particular system design. Furthermore, although aperture 306 is shown as rectangular, the particular shape of aperture 306 could be varied and would most likely be round.

Highlight source 104 provides highlight signal 110 to shared optical element 108. A laser source 312 shines laser light constituting lightfield 216 through a diffuser 314 and onto highlight modulator 212. Diffuser 314 removes laser and/or optical fiber modal noise from the laser light. Together, laser source 312 and diffuser 314 compose highlight light source 210. Highlight modulator 212 spatially modulates lightfield 216 to generate highlight signal 110 and directs highlight signal 110 toward a lens group 316. Lens group 316 is oriented to direct highlight signal 110 onto optical element 108, which includes a reflective surface 318 (e.g. a tilted mirror) oriented to direct highlight signal 110 toward lens group 308.

Optical element 108 may be located on the Fourier plane of the system comprising highlight modulator 212 and lens group 316, and highlight modulator 212 steers lightfield 216 at relatively small angles. As a result, the important components of highlight signal 110 are near the DC term in the Fourier plane. In addition, the lightfield carried by highlight signal 110 is configured to have a low spatial frequency. Thus, because of these features, reflective surface 318 can be relatively small compared to aperture 306.

Highlight signal 110 is reflected from reflective surface 318, is transmitted through lens group 308 and prism 310, and is focused on an image plane of primary modulator 218. Lens group 308 may need an increased diameter to accommodate highlight signal 110 being off-center relative to aperture 306. Primary modulator 218 spatially modulates the combination of base signal 106 and highlight signal 110 to form imaging signal 220, which is directed toward additional projection optics (not shown).

In alternate embodiments it may be desirable to alter the incoming angle of highlight signal 210. In these embodiments, it may be necessary to alter the orientation of reflective surface 318 and/or optical element 108. Additionally, it may be desirable to make reflective surface 318 and/or optical element 108 adjustable.

Although shown with a single highlight signal 110, system 100 can be modified to combine base signal 106 with multiple highlight signals 110. For example, system 100 can be modified to combine base beam 106 with separate red, green, and blue highlight signals via aperture sharing. In one example embodiment, the red, green, and blue highlight signals can share reflective surface 318 in a time multiplexed manner. In another example embodiment, a separate reflective surface can be provided for each of the red, green, and blue (or other color) highlight signals.

Figure 4:
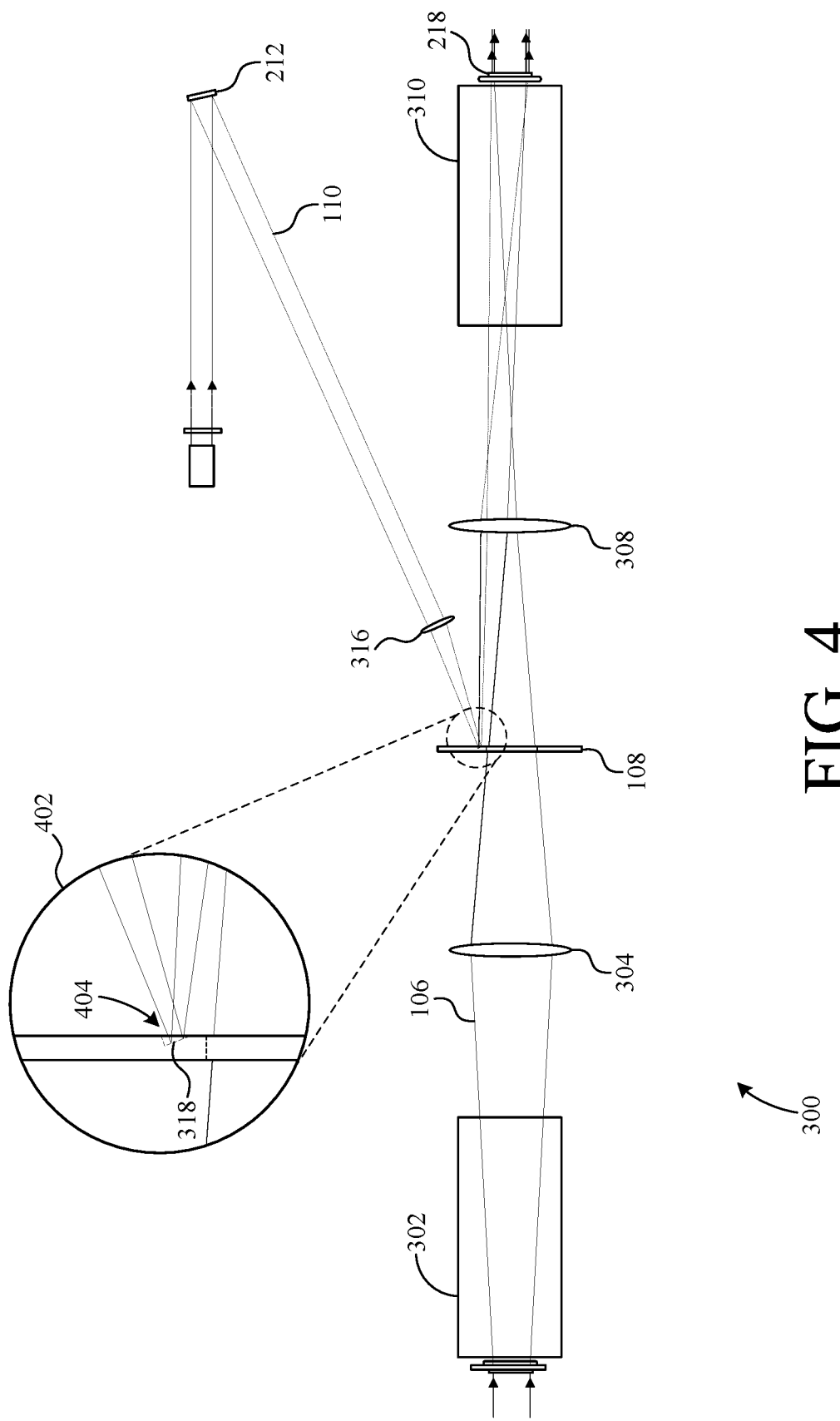
FIG. 4 is a side view showing the portion of the projection system of FIG. 3.

FIG. 4 is a side view showing portion 300 of projection system 100. From FIG. 4, it can be appreciated that reflective surface 318 is recessed into optical element 108 and oriented at an angle with respect thereto. A close-up 402 shows a portion of optical element 108, including a recess 404 having reflective surface 318 disposed inside. Optionally, reflective surface 318 can be included in separate mirror disposed immediately in front (to the right in FIG. 4) of optical element 108. Reflective surface 318 is angled to direct light entering the optical system from highlight modulator 212 (at relatively oblique angles) toward lens group 308.

Figure 5:
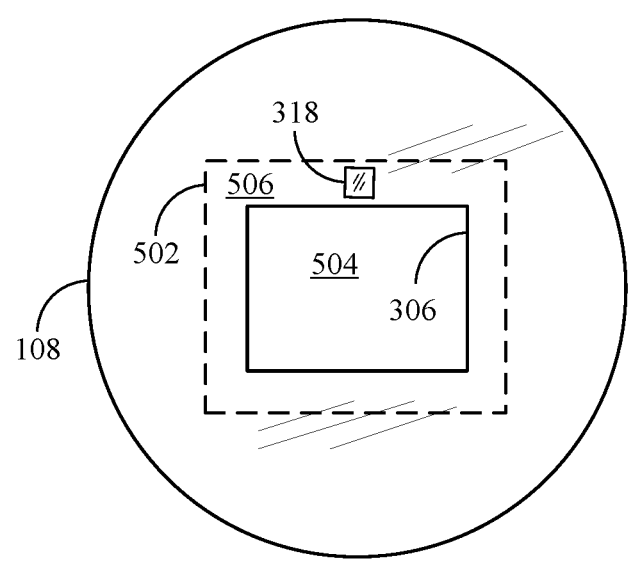
FIG. 5 is a front view showing the shared optical element of the projection system of FIG. 1.

FIG. 5 is a front view of shared optical element 108 (aperture stop) of projection system 100. FIG. 5 shows the relative sizes of aperture 306 and reflective surface 318, the latter being much smaller than the former. Because aperture 306 functions as the aperture stop of projection system 100 for base signal 106, and highlight signal 110 is focused onto reflective surface 318, aperture 306 is significantly larger than reflective surface 318. However, the relative sizes of reflective surface 318 and aperture 306 are not essential features of the present invention. For example, the entirety of optical element 108 (aside from aperture 306) could constitute reflective surface 318. Additionally, aperture 306 can be a mechanical aperture having variable size.

Together, aperture 306 and reflective surface 318 form a relay aperture 502 that is shared by base signal 106 and highlight signal 110. Aperture 306 forms a first portion 504 of relay aperture 502, and reflective surface 318 forms a second portion 506 of relay aperture 502. Directing base signal 106 through the first portion (aperture 306) of relay aperture 502 and directing highlight signal 110 through (e.g., reflected from) the second portion (reflective surface 318) of relay aperture 502 effectively combines the two separately modulated signals 106 and 110 (FIG. 4).

In this example embodiment, reflective surface 318 occupies only a small portion of the second portion 506 of relay aperture 502. However, more of relay aperture 502 can be used if desired. In addition, because a projection aperture (not shown) of projection system 100 is larger (e.g., has a smaller F-number) than relay aperture 502, relay aperture 502 can be expanded up to the size of the projection aperture. Indeed, embodiments of the present invention exploit the size difference between aperture 306 and the projection aperture (not shown) to introduce the second portion 506 of relay aperture 502, within the size limits of the projection aperture.

Figure 6:
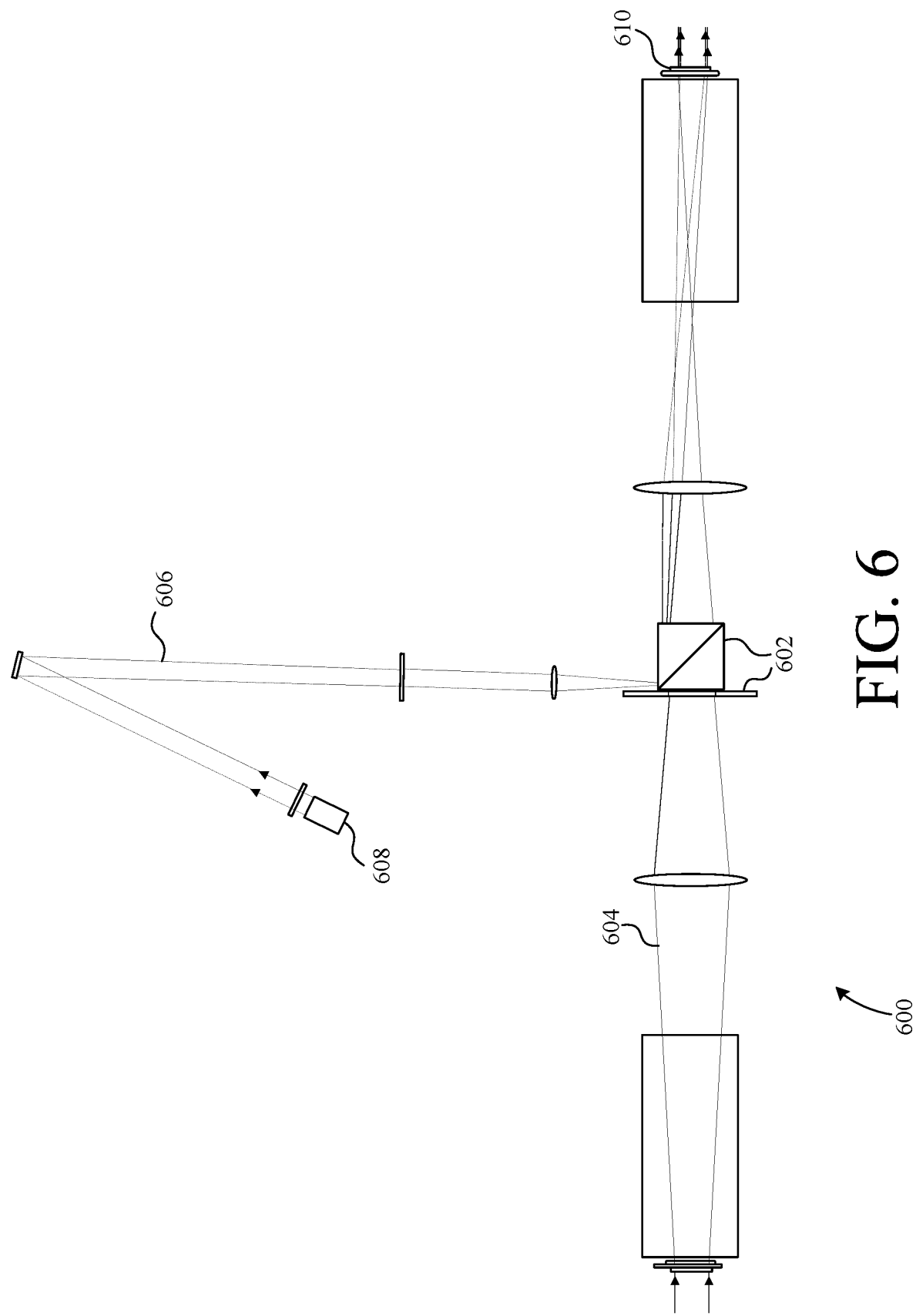
FIG. 6 is a side view showing a portion of an example alternate projection system.

FIG. 6 is a side view of a portion of an alternate projection system 600. Projection system 600 is substantially similar to projection system 100, except for an alternate shared optical element 602. In system 600, optical element 602 is a beam combining prism (e.g., a TIR prism in combination with an aperture stop. A base signal 604 enters optical element 602 from one direction, while a highlight signal 606 enters optical element 602 from another direction. Base signal 604 and highlight signal 606 both exit optical element 602 on the same side, traveling generally in the same direction.

In particular embodiments it may be desirable for highlight signal 606 to consist of light polarized at a particular orientation (e.g. "s" polarized) when entering optical element 602. In such an embodiment, diffuser 314 can be replaced with a polarizing diffuser or a polarizer can be added somewhere along the optical path of highlight signal 606 between optical element 602 and a highlight light source 608. Additionally, it may be desirable to alter the optics between optical element 602 and a primary modulator 610, based on the particular characteristics of optical element 602 (e.g. size, diffraction index, etc.). For example, alternate relay optics may be desirable should the inclusion of optical element 602 create a significant difference between the image distance of projection system 600 and the image distance of projection system 100.

Figure 7:
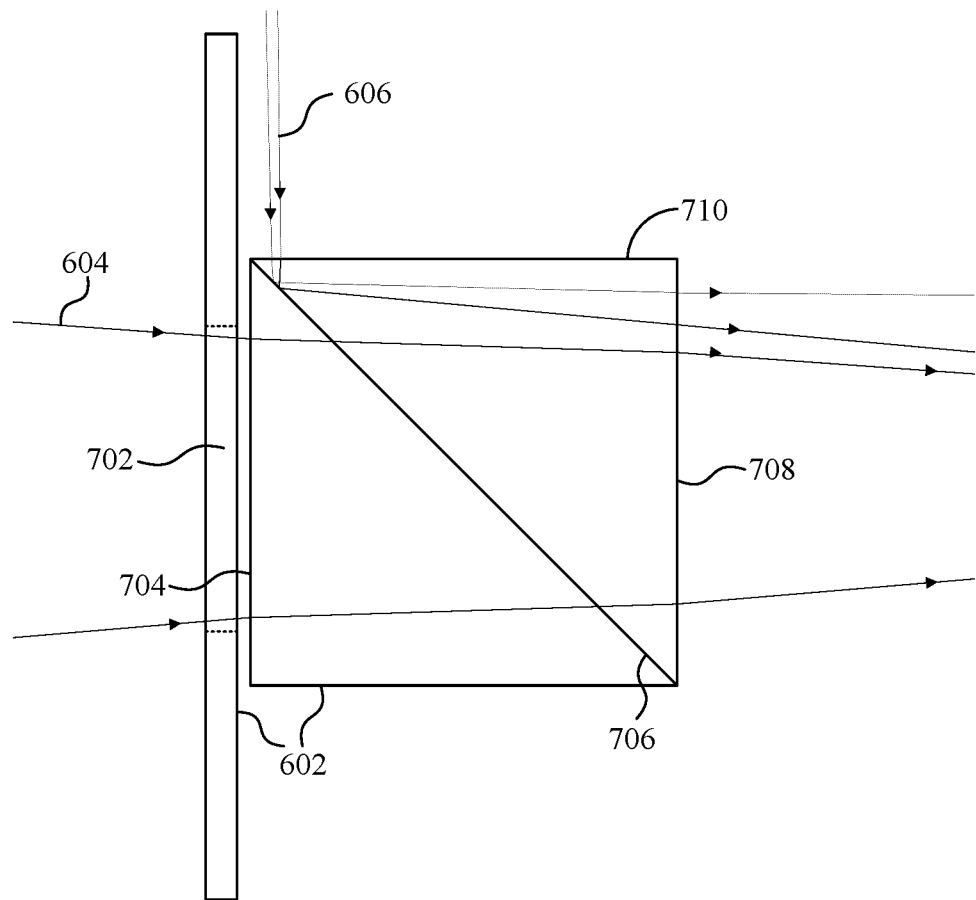
FIG. 7 is a side view showing the shared optical element and the aperture of FIG. 6 in greater detail.

FIG. 7 is a side view showing shared optical element 602 in greater detail to define an aperture 702. Base signal 604 passes through aperture 702 and enters optical element 602 through a side surface 704 of optical element 602. Base signal 604 is transmitted through an angled surface 706 within optical element 602 and exits optical element 602 through a second side surface 708, opposite first side surface 704. Highlight signal 606 enters optical element 602 through a top surface 710, reflects off of angled surface 706, and exits optical element 602 through side surface 708. Optical element 602 discriminates between base signal 604 and highlight signal 606 based on angle. (i.e. beams composing base signal 604 strike angled surface 706 at relatively flat angles, and beams composing highlight signal 606 strike angled surface 706 at relatively oblique angles.) Thus, base signal 604 has a significantly higher transmission than highlight signal 606. Additionally, it may be desirable to apply an optical coating to angled surface 706 in order to aid transmittance and reflectance of base signal 604 and highlight signal 606, respectively.

Figure 8:
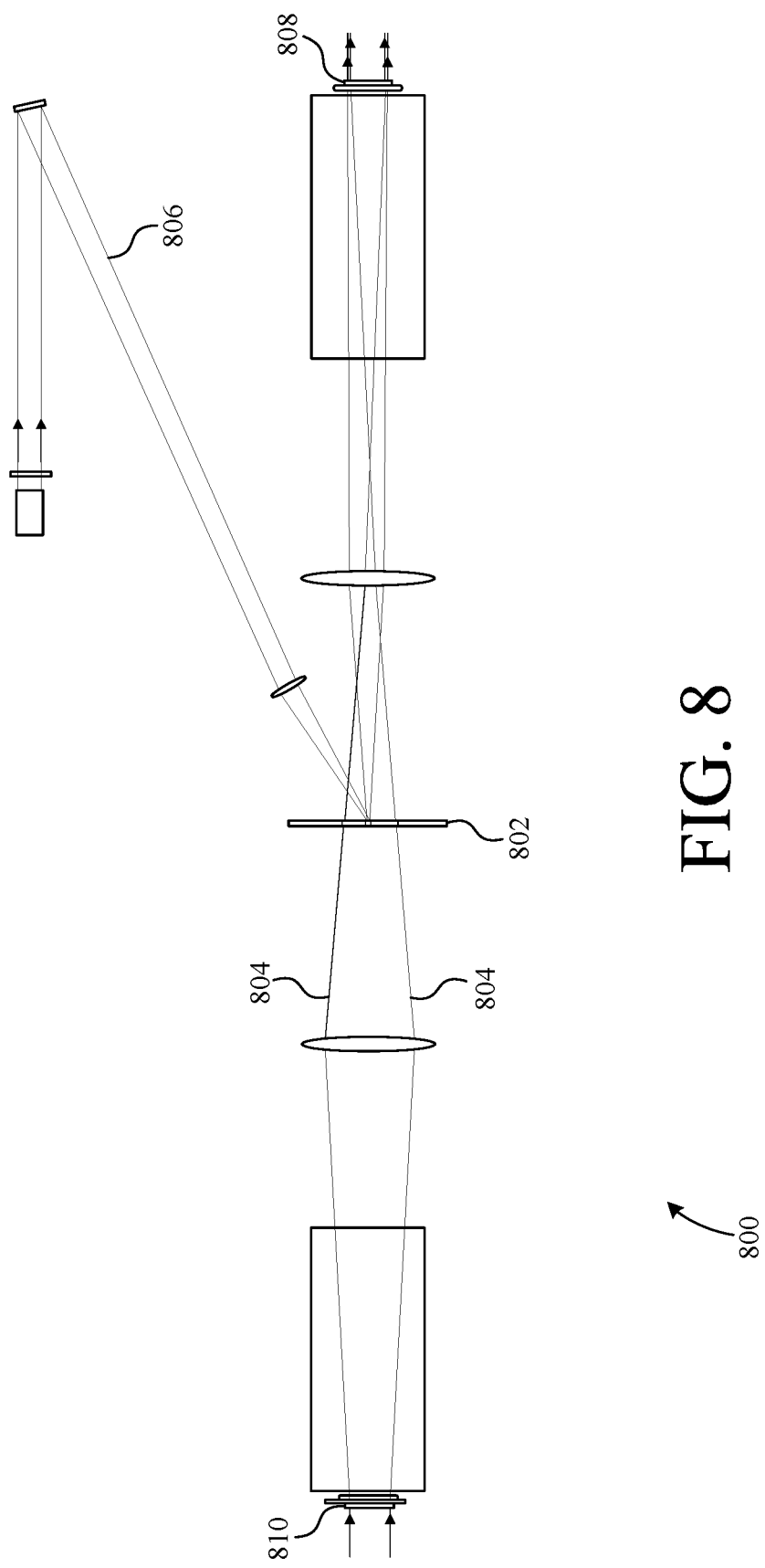
FIG. 8 is a side view showing a portion of another alternate projection system.

FIG. 8 is a side view of a portion of an alternate projection system 800. Projection system 800 is substantially similar to projection system 100, except for an alternate shared optical element 802. In system 800, optical element 802 is an annular aperture stop having a reflective surface centered on the optical axis (with respect to base signal 804) of projection system 800. A base signal 804 passes through optical element 802 from one direction, while a highlight signal 806 strikes optical element 802 from another direction. Base signal 804 and highlight signal 806 are both directed along the same optical path by optical element 802.

Because optical element 802 directs base signal 804 and highlight signal 806 along optical paths that are both symmetric (e.g., parallel, coincident, etc.) with respect to the optical axis of the system, the optics between optical element 802 and a primary modulator 808 may be smaller compared with those of projection systems 100 and 600. Additionally, because the reflective surface of optical element 802 is centered in the aperture, it can double as a light dump for light steered at small angles.

The annular aperture of optical element 802 may cause projection system 800 to have a donut-shaped point spread function (PSF) with respect to base signal 804, rather than a Gaussian SF, as is typical. The donut-shaped PSF can be accommodated for by the lightfield simulation and/or when generating drive values for pre-modulator 810.

Figure 9A:
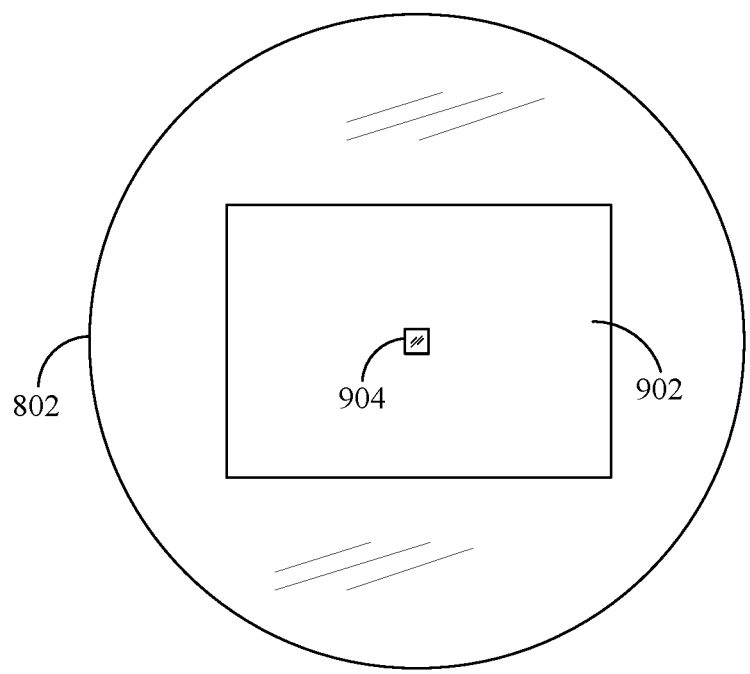
FIG. 9A is a front view showing a shared optical element of FIG. 8 in greater detail.

FIG. 9A is a front view showing optical element 802 in greater detail. Base signal 804 travels through a large, rectangular, annular aperture 902 (between the outer perimeter of aperture 902 and an outer perimeter of a reflective surface 904). Highlight signal 806 reflects off of reflective surface 904, centered within aperture 902. Together, aperture 902 and reflective surface 904 constitute an enlarged aperture stop with a small, central, reflective obscuration. Optical element 802 allows both base signal 804 and highlight signal 806 to travel such that they are symmetric about the optical axis of projection system 800 after encountering optical element 802.

Figure 9B:
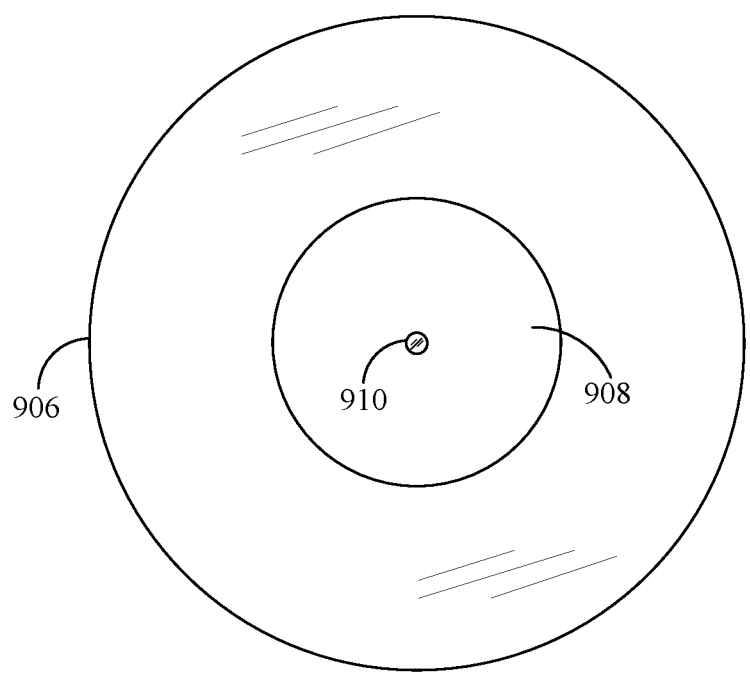
FIG. 9B is a front view showing an alternate shared optical element.

FIG. 9B is a front view showing an alternate optical element 906. Base signal 804 travels through a large, circular, annular aperture 908, and highlight signal 806 reflects off of a reflective surface 910, centered within aperture 908. In alternate embodiments, circular reflective surface 910 can be used in combination with rectangular aperture 902, and rectangular reflective surface 904 can be used within circular aperture 908.

Figure 10:
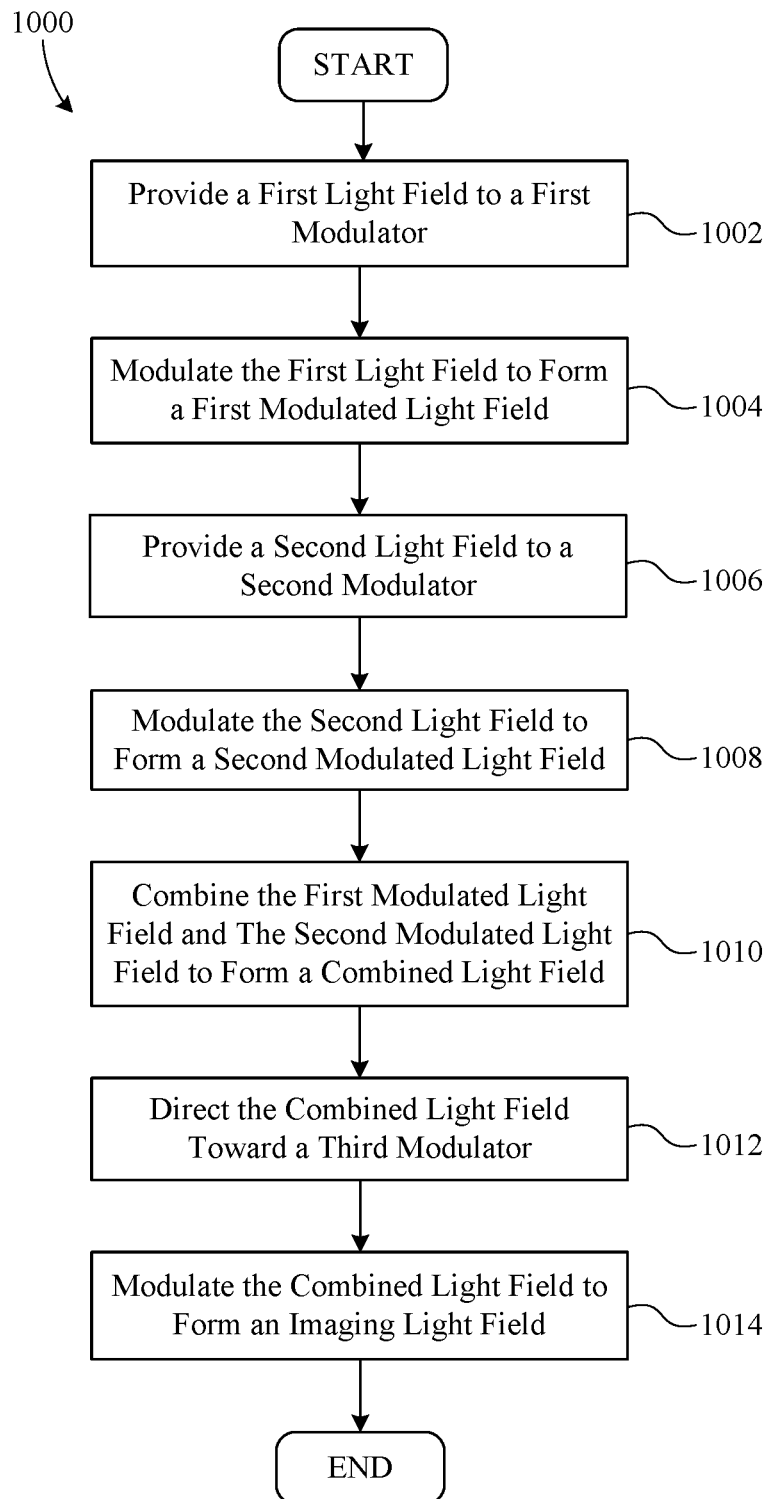
FIG. 10 is a flow chart summarizing an example method for adding highlight illumination to a projected base image.

FIG. 10 is a flowchart illustrating an example method 1000 for adding highlight illumination to a projected base image. In a first step 1002, a first lightfield is provided to a first modulator. Next, in a second step 1004, the first lightfield is modulated to form a first modulated lightfield. Then, in a third step 1006, a second lightfield is provided to a second modulator. Next, in a fourth step 1008, the second lightfield is modulated to form a second modulated lightfield. Then, in a fifth step 1010, the first modulated lightfield and the second modulated lightfield are combined to form a combined lightfield. Next, in a sixth step 1012, the combined lightfield is directed toward a third modulator. Finally, in a seventh step 1014, the combined lightfield is modulated to form an imaging lightfield.

Figure 11:
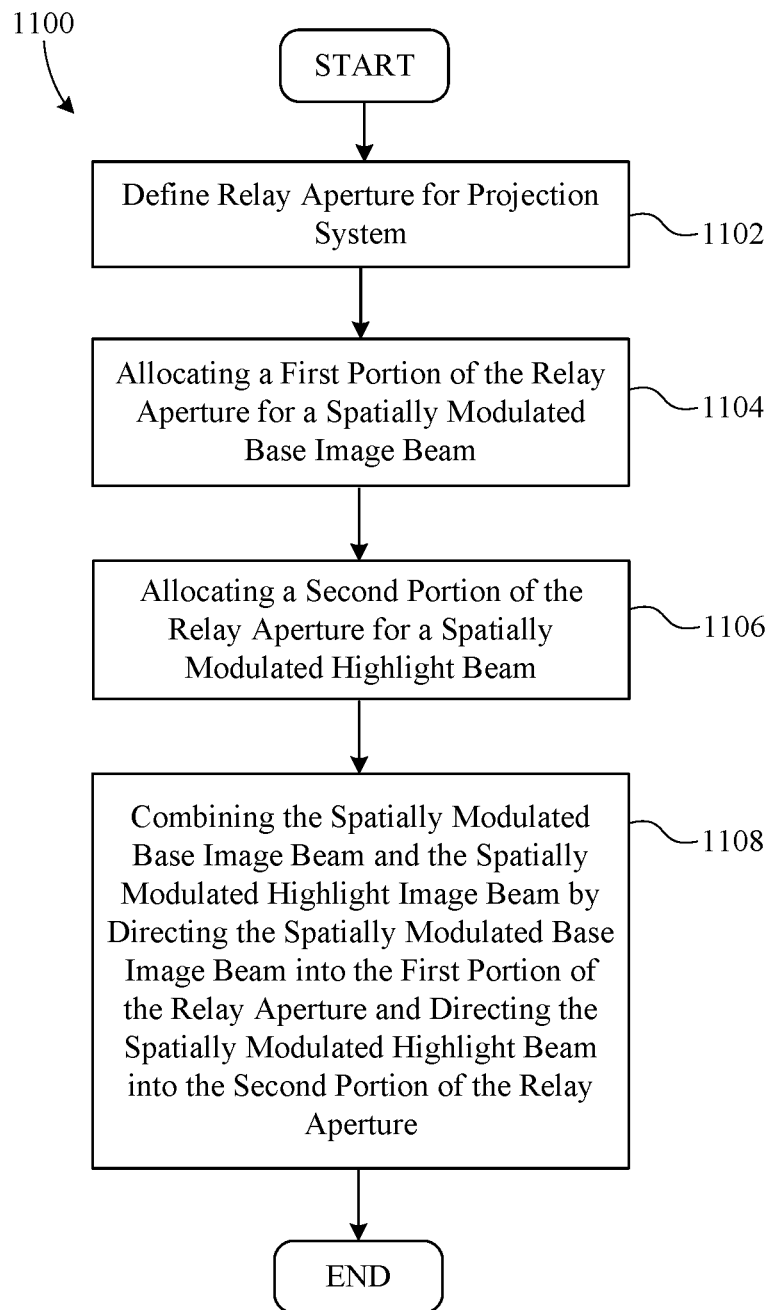
FIG. 11 is a flowchart summarizing an example method of combining a spatially modulated base image beam and a spatially modulated highlight image beam.

FIG. 11 is a flowchart summarizing an example method 1100 of combining a spatially modulated base image beam and a spatially modulated highlight image beam. In a first step 1102, a relay aperture is defined for a projection system. Then, in a second step 1104, a first portion of the relay aperture is allocated for a spatially modulated base image beam. Next, in a third step 1106, a second portion of the relay aperture is allocated for a spatially modulated highlight beam. Then, in a fourth step 1108 the spatially modulated base image beam and the spatially modulated highlight image beam are combined by directing the spatially modulated base beam into the first portion of the relay aperture and directing the spatially modulated highlight beam into the second portion of the relay aperture.

Figure 12:
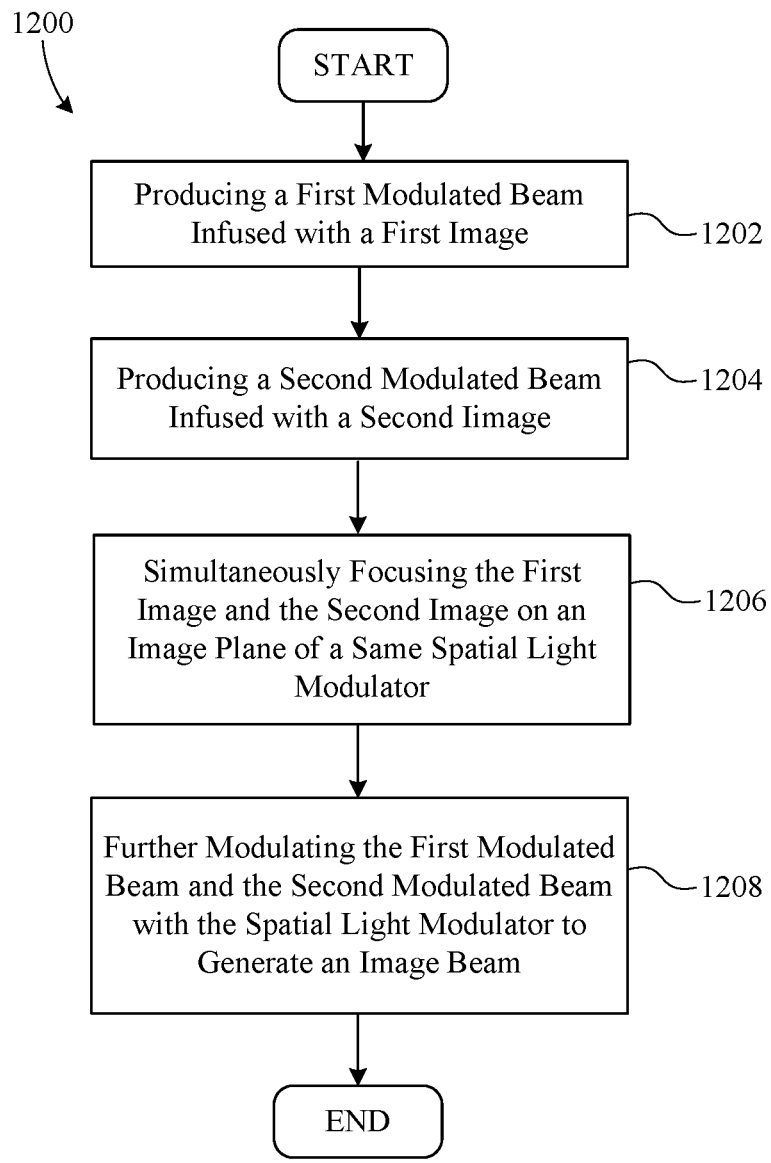
FIG. 12 is a flowchart summarizing an example method of generating an image beam.

FIG. 12 is a flowchart summarizing an example method 1200 of generating an image beam. In a first step 1202, a first modulated beam infused with a first image is produced. In a second step 1204, a second modulated beam infused with a second image is produced. Then, in a third step 1206, the first image and the second image are simultaneously focused on an image plane of a same spatial light modulator. Then, in a fourth step 1208, the first modulated beam and the second modulated beam are further modulated with the spatial light modulator on which the first image and the second image are simultaneously focused.

The description of particular embodiments of the present invention is now complete. Many of the described features may be substituted, altered or omitted without departing from the scope of the invention. For example, alternate optics (e.g., different types, sizes, numbers of lenses, prisms, mirrors, etc.), may be substituted for optics 206, 214, and 216. In addition, although embodiments of the invention are illustrated using single channel projectors for the sake of simple explanation, it should be understood that the present invention can, and most likely would, be used in multi-channel color projection systems. In that case, for example, single modulators (e.g., 204, 212, and/or 218) would each be replaced with a plurality of modulators, one for each color, arranged, for example, in a Philips prism. As yet another example, selectively reflective surfaces can be substituted for the reflective surfaces used to combine the optical paths of a base signal and a highlight signal. Examples of selectively reflective surfaces include, but are not limited to, phase and wavelength selective surfaces. These and other deviations from the particular embodiments shown will be apparent to those skilled in the art, particularly in view of the foregoing disclosure.

We claim:

1. A system for generating images, comprising:
   a first modulator configured to modulate a first lightfield to form a base modulated lightfield;
   a second modulator configured to modulate a second lightfield to form a highlight modulated lightfield;
   a shared optical element configured to combine the base modulated lightfield and the highlight modulated lightfield to form a combined lightfield; and
   a third modulator configured to modulate the combined lightfield to form an imaging lightfield.

2. The system of claim 1, wherein the shared optical element comprises:
   a first portion configured to direct the base modulated lightfield; and
   a second portion configured to direct the highlight modulated lightfield.

3. The system of claim 1, wherein the shared optical element comprises a relay aperture, and the relay aperture comprises:
   an aperture configured to direct the base modulated lightfield through the aperture; and
   a reflective surface configured to receive and reflect the highlight modulated lightfield.

4. The system of claim 1, wherein the shared optical element comprises a beam combining prism, and the beam combining prism comprises a surface configured to transmit the base modulated lightfield and reflect the highlight modulated lightfield.

5. The system of claim 1, wherein the shared optical element comprises an annular aperture, and the annular aperture comprises:
   an aperture configured to direct the base modulated lightfield through the aperture; and
   a reflective surface centered within the aperture, the reflective surface configured to receive and reflect the highlight modulated lightfield.

6. The system of claim 5, wherein the aperture is circular or rectangular, and the reflective surface is circular or rectangular.

7. The system of claim 1, further comprising:
   optics configured to direct the combined lightfield towards the third modulator.

8. The system of claim 1, further comprising:
   a first light source configured to generate the first light field directed towards the first modulator; and
   a second light source configured to generate the second light field directed towards the second modulator.

9. The system of claim 1, wherein the highlight modulated lightfield has a low spatial frequency compared to the base modulated lightfield.

10. The method of claim 1, wherein the shared optical element comprises:
    a first portion configured to direct the base modulated lightfield; and
    a second portion configured to direct the highlight modulated lightfield.

11. The method of claim 1, wherein the shared optical element comprises a relay aperture, and the relay aperture comprises:
    an aperture configured to direct the base modulated lightfield through the aperture; and
    a reflective surface configured to receive and reflect the highlight modulated lightfield.

12. The method of claim 1, wherein the shared optical element comprises a beam combining prism, and the beam combining prism comprises a surface configured to transmit the base modulated lightfield and reflect the highlight modulated lightfield.

13. The method of claim 1, wherein the shared optical element comprises an annular aperture, and the annular aperture comprises:
    an aperture configured to direct the base modulated lightfield through the aperture; and
    a reflective surface centered within the aperture, the reflective surface configured to receive and reflect the highlight modulated lightfield.

14. The method of claim 13, wherein the aperture is circular or rectangular, and the reflective surface is circular or rectangular.

15. The method of claim 1, further comprising:
    modulating the combined lightfield by a third modulator to form an imaging lightfield.

16. The method of claim 15, further comprising:
    directing the combined lightfield towards the third modulator by optics.

17. The method of claim 1, further comprising:
    generating the first light field directed towards the first modulator by a first light source; and generating the second light field directed towards the second modulator a second light source.

18. A method for generating images, comprising:

modulating a first lightfield by a first modulator to form a base modulated lightfield;

modulating a second lightfield by a second modulator to form a highlight modulated lightfield; and combining the base modulated lightfield and the highlight modulated lightfield by a shared optical element to form a combined lightfield;

wherein the highlight modulated lightfield has a low spatial frequency compared to the base modulated lightfield.

* * * * *